US012585977B2

(12) United States Patent
Hu et al.

(10) Patent No.: US 12,585,977 B2
(45) Date of Patent: Mar. 24, 2026

(54) BUILDING A COMPLEMENTARY MODEL FOR AGGREGATING TOPICS FROM TEXTUAL CONTENT

(71) Applicant: International Business Machines Corporation, Armonk, NY (US)

(72) Inventors: Zhi Lin Hu, Ningbo (CN); Wan Wan Miao, Ningbo (CN); Shu Xia Cao, Beijing (CN); Tao Liu, Dublin, OH (US); Hao Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 16/733,990

(22) Filed: Jan. 3, 2020

(65) Prior Publication Data
US 2021/0209500 A1        Jul. 8, 2021

(51) Int. Cl.
*G06N 20/00*        (2019.01)
*G06F 8/60*        (2018.01)
        (Continued)

(52) U.S. Cl.
CPC .............. *G06N 20/00* (2019.01); *G06F 8/60* (2013.01); *G06F 40/30* (2020.01); *G06N 5/02* (2013.01); *G06N 5/04* (2013.01)

(58) Field of Classification Search
CPC . G06N 20/00; G06N 5/02; G06N 5/04; G06F 40/30; G06F 8/60
        (Continued)

(56) References Cited

U.S. PATENT DOCUMENTS 9,852,132 B2    12/2017    Chhichhia et al.
9,922,032 B2    3/2018    Lightner et al.
        (Continued)

FOREIGN PATENT DOCUMENTS

CN        107247701 A        10/2017
CN        109271502 A        1/2019
        (Continued)

OTHER PUBLICATIONS

Muhammad Taimoor khan, Mehr Durrani, Shehzad Khalid and Furqan Aziz, "Online Knowledge-Based Model for Big Data Topic Extraction," Computational Intelligence and Neuroscience, vol. 2016, Article ID 6081804, 10 pages.

*Primary Examiner* — Thuy Dao
*Assistant Examiner* — Zengpu Wei
(74) *Attorney, Agent, or Firm* — Patterson + Sheridan, LLP

(57)        ABSTRACT

Aspects of the present disclosure describe techniques for generating a machine learning model for extracting information from textual content. The method generally includes receiving a training data set including a plurality of documents having related textual strings. A relevancy model is generated from the training data set. The relevancy model is generally configured to generate relevance scores for a plurality of words extracted from the plurality of documents. A knowledge graph model illustrating relationships between the plurality of words extracted from the plurality of documents is generated from the training data set. The relevancy model and the knowledge graph model are aggregated into a complimentary model including a plurality of nodes from the knowledge graph model and weights associated with edges between connected nodes, wherein the weights comprise relevance scores generated from the relevancy model,
        (Continued)

and the complimentary model is deployed for use in analyzing documents.

20 Claims, 5 Drawing Sheets

(51) Int. Cl.
  *G06F 40/30*          (2020.01)
  *G06N 5/02*           (2023.01)
  *G06N 5/04*           (2023.01)

(58) Field of Classification Search
  USPC .......................................................... 706/12
  See application file for complete search history.

(56)                  References Cited

U.S. PATENT DOCUMENTS

| | | | |
|---|---|---|---|
| 9,949,051 B2 | 4/2018 | Higgens et al. | |
| 10,204,026 B2 | 2/2019 | Weissinger et al. | |
| 10,303,771 B1 * | 5/2019 | Jezewski ................ | G06K 9/627 |
| 10,867,171 B1 * | 12/2020 | Contryman ............ | G06N 20/20 |
| 10,997,499 B1 * | 5/2021 | Kayyoor ................ | G06N 20/00 |
| 2009/0094233 A1 | 4/2009 | Marvit et al. | |
| 2014/0303962 A1 * | 10/2014 | Minca ................... | G06F 40/242 |
| | | | 704/9 |
| 2018/0032606 A1 | 2/2018 | Tolman et al. | |
| 2019/0108286 A1 * | 4/2019 | Pan ...................... | G06Q 10/107 |
| 2019/0325066 A1 * | 10/2019 | Krishna ............... | G06N 3/0472 |
| 2020/0084084 A1 * | 3/2020 | Karunanidhi ....... | H04L 41/0604 |
| 2020/0133964 A1 * | 4/2020 | Lee ...................... | G06F 16/355 |
| 2020/0175052 A1 * | 6/2020 | Wang ................... | G06F 16/358 |
| 2021/0055112 A1 * | 2/2021 | Michener .............. | G01C 21/32 |
| 2021/0117509 A1 * | 4/2021 | Aditya .................. | G06N 20/00 |
| 2021/0157861 A1 * | 5/2021 | Katzman ................ | G06F 16/93 |

FOREIGN PATENT DOCUMENTS

| | | | |
|---|---|---|---|
| CN | 111125355 A | * | 5/2020 |
| WO | WO-2020101477 A1 | * | 5/2020 |

* cited by examiner

BUILDING A COMPLEMENTARY MODEL FOR AGGREGATING TOPICS FROM TEXTUAL CONTENT

BACKGROUND

Aspects of the present disclosure relate to building models for extracting topic information from textual content, and more specifically to techniques for building a complementary model based on a relevancy model and a knowledge graph model.

Many real-world operations are defined in terms of complex, lengthy documents or sets of documents. For example, in an industrial environment, a specification document may define requirements for physical goods to be produced, such as size, materials, tolerances, and the like. In another example, a specification document for a service to be implemented or provided may define requirements for the service such as accessibility, minimum uptime, redundancy, security, and other properties. In still another example, documents used to specify how to diagnose various medical conditions may include information about various symptoms or test results, where no one symptom or result may be dispositive of a diagnosis but multiple symptoms or test results may indicate a condition to be treated.

Where an operation is defined by these complex, lengthy documents, identifying important information from these documents may be a time consuming task. However, in many cases, organizations that regularly handle these documents (e.g., in requests for proposals (RFPs), contract solicitations, etc.) may need to quickly identify important data in these documents. To do so, machine learning models may be used to analyze these documents. However, because organizations may have a limited amount of documents that can be used to train such machine learning models, the resulting machine learning models may not perform well and may require significant additional effort to train the machine learning model, annotate documents used to train the machine learning model, and the like.

SUMMARY

One aspect of the present disclosure provides a method for generating a machine learning model for extracting information from textual content. The method generally includes receiving a training data set including a plurality of documents having related textual strings. A relevancy model is generated from the training data set. The relevancy model is generally configured to generate relevance scores for a plurality of words extracted from the plurality of documents. A knowledge graph model illustrating relationships between the plurality of words extracted from the plurality of documents is generated from the training data set. The relevancy model and the knowledge graph model are aggregated into a complimentary model including a plurality of nodes from the knowledge graph model and weights associated with edges between connected nodes, wherein the weights comprise relevance scores generated from the relevancy model, and the complimentary model is deployed for use in analyzing documents.

Another aspect of the present disclosure provides a system for generating a machine learning model for extracting information from textual content. The system generally includes a processor and a memory having instructions which, when executed by the processor, performs an operation for generating a machine learning model. The operation generally includes generally includes receiving a training data set including a plurality of documents having related textual strings. A relevancy model is generated from the training data set. The relevancy model is generally configured to generate relevance scores for a plurality of words extracted from the plurality of documents. A knowledge graph model illustrating relationships between the plurality of words extracted from the plurality of documents is generated from the training data set. The relevancy model and the knowledge graph model are aggregated into a complimentary model including a plurality of nodes from the knowledge graph model and weights associated with edges between connected nodes, wherein the weights comprise relevance scores generated from the relevancy model, and the complimentary model is deployed for use in analyzing documents.

Still another aspect of the present disclosure provides a computer-readable medium having instructions stored thereon which, when executed by a processor, performs an operation for generating a machine learning model for extracting information from textual content. The operation generally includes generally includes receiving a training data set including a plurality of documents having related textual strings. A relevancy model is generated from the training data set. The relevancy model is generally configured to generate relevance scores for a plurality of words extracted from the plurality of documents. A knowledge graph model illustrating relationships between the plurality of words extracted from the plurality of documents is generated from the training data set. The relevancy model and the knowledge graph model are aggregated into a complimentary model including a plurality of nodes from the knowledge graph model and weights associated with edges between connected nodes, wherein the weights comprise relevance scores generated from the relevancy model, and the complimentary model is deployed for use in analyzing documents.

DETAILED DESCRIPTION

Various machine learning models can be used to extract information from documents. Relevancy-based models may extract topics from a document based on relevancy scores calculated for each topic identified in a document based on the number of occurrences of the topic in the document relative to another topic. Knowledge graph-based models may identify topics based on a graph established from a corpus of documents, in which connections between nodes in the graph represent relationships between different topics in the document. Individually, these models may extract information from a document; however, individually, these documents may not be able to extract the most relevant or useful information from the document or may not be able to identify the strength of a relationship between different topics in the document.

Aspects of the present disclosure provide techniques for generating a complementary model for extracting information from textual content. As discussed in further detail below, a complementary model may be generated by combining a relevancy model with a knowledge graph model to generate a weighted knowledge graph that can be used to extract topics and other information from a document. By combining a relevancy model with a knowledge graph model, a weighted knowledge graph can identify information that is most relevant to a given topic, which may allow a user to more quickly take action based on the identified information.

Figure 1:
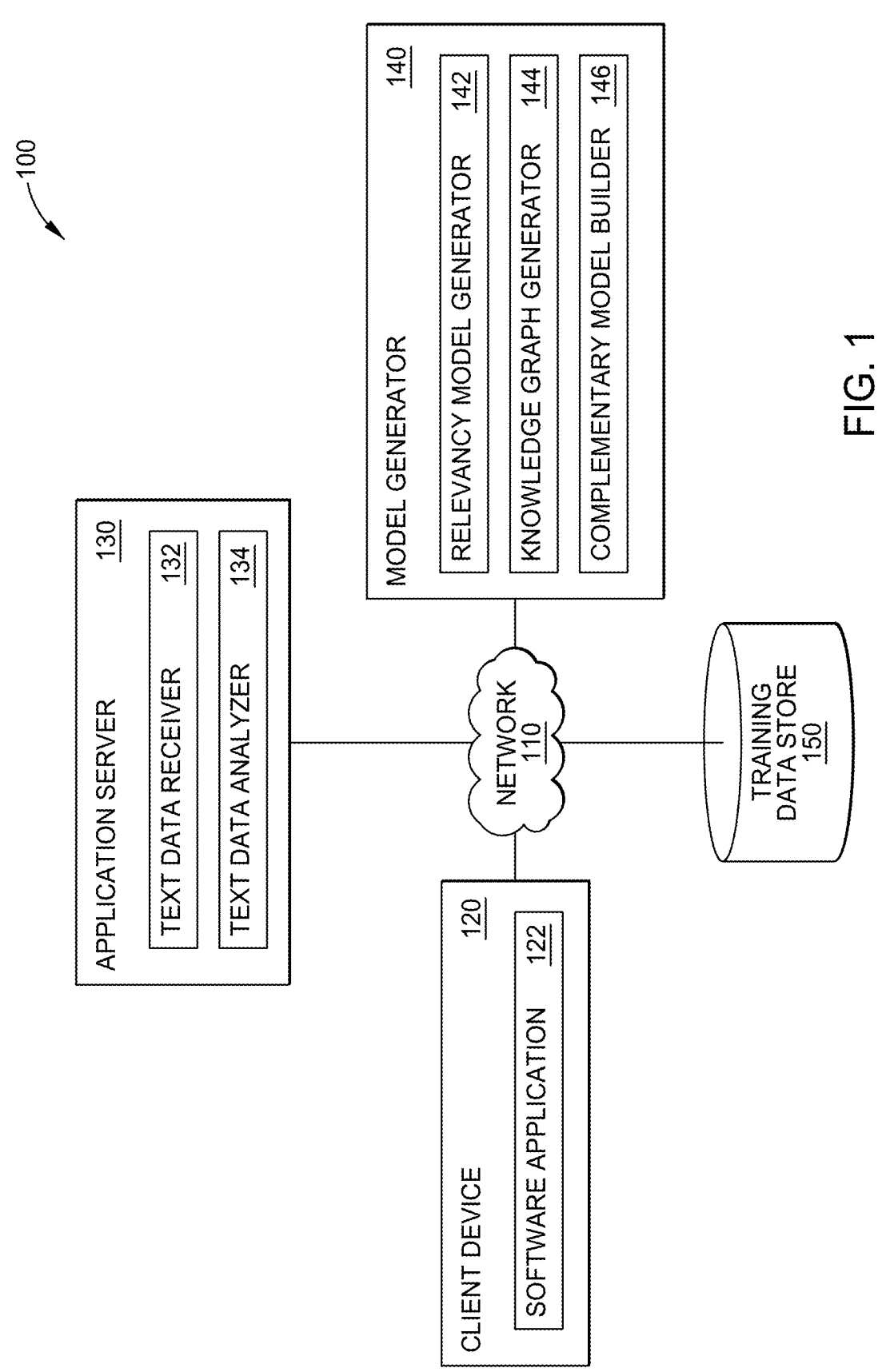
FIG. 1 illustrates an example networked computing environment in which a complementary model is generated from a relevancy model and a knowledge graph model trained from a training data set of documents, according to one embodiment.

FIG. 1 illustrates an example networked computing environment in which a complementary model for extracting information from textual content is generated from a relevancy model and a knowledge graph model, according to an embodiment of the present disclosure. As illustrated, computing environment 100 includes a client device 120, an application server 130, a model generator 140, and a training data store 150.

Client device 120 is generally representative of computing devices on which a user can access a service executing on application server 130 to generate a complementary model for extracting information from textual content and use the generated complementary model to identify topics in a document provided to a system for analysis. As illustrated, client device includes a software application 122.

Software application 122 generally provides an interface through which a user can invoke complementary model generation operations at model generator 140 and use the generated complementary model to extract information from a document. In some embodiments, software application 122 may be a web browser or other application that allows a user to interact with an application hosted remotely on application server 130. Generally, to invoke complementary model generation operations at model generator 140, software application 122 can transmit a command to model generator 140 to initiate the process of generating the complementary model based on a specified training data set of documents. Generally, the documents may be a corpus of related documents, such as a collection of requests for proposals, a collection of medical diagnosis documents, or other collections of related documents, from which a complementary model is to be trained to extract important information from similar documents. To extract information from a document, software application 122 can transmit the document or an information identifying a location from which the document can be accessed to application server 130 along with a request to extract information from the specified document.

Application server 130 generally includes a text data receiver 132 and a text data analyzer 134. Text data receiver 132 generally receives a document and processes the document into a format that text data analyzer 134 can use in extracting topics or other information from the document. For example, text data receiver 132 can re-format received documents into plaintext documents, localize documents, convert into encoding schemes used by text data analyzer 134, and the like.

Text data analyzer 134 generally uses a complementary model generated by model generator 140 to extract information from a document or textual content provided to application server 130 by a user. Generally, text data analyzer 134 uses the weight information in the complementary model to identify topics based on the number of connections identified to a topic and a weight of each of the connections. For example, the information extracted from the document or other provided textual content may be, for example, the information in a node having connections with the highest number of nodes associated with the provided textual content in the knowledge graph and the highest relevancy scores associated with the connections. In some embodiments, text data analyzer 134 can identify a number of relevant topics based on a threshold number of connections and threshold relevancy score associated with the connections such that any number of potentially relevant topics may be extracted from the provided document or text content. Once text data analyzer 134 extracts information from the provided document or text content, text data analyzer 134 can output the extracted information for display in software application 122 on client device 100.

Model generator 140 generally uses a training data set of documents or other textual content to generate a complementary model from a relevancy model and a knowledge graph model. As illustrated, model generator 140 includes a relevancy model generator 142, a knowledge graph generator 144, and a complementary model builder 146.

Relevancy model generator 142 generally builds a relevancy model that extracts topics based on a relevancy score for each term identified in a document. To generate a relevancy model, relevancy model generator 142 parses a document or other received textual content to identify nouns (i.e., topics) in the document. For each noun identified in the document, relevancy model generator 142 generates a count for each time the noun is identified in the document and a relevance score for each pair of unique nouns identified in the document. The identified nouns may be sorted based on the number of times each noun occurs in the document or other received textual content, and a number of words may be selected as the topics extracted from the document. In some embodiments, where multiple nouns are identified the same number of times in a document, an average relevance score is used to rank the identified noun. Relevancy model generator 142 can select a number of words as topics included in the relevancy model. The selected number of words may be, for example, a pre-defined threshold parameter defined for the relevancy model generator 142 or for the training data set of documents provided to relevancy model generator 142.

For example, suppose that relevancy model generator 142 is building a relevancy model based on the sentence "The system should support a mainstream relational database, such as Oracle, SQL Server, DB2, MySQL, or PostgreSQL." The nouns identified in the sentence may be "system," "database," "Oracle," "SQL Server," "DB2," "MySQL," and "PostgreSQL." For each of these nouns, a relevance score can be calculated between the noun and the other nouns. The relevance score can be determined, for example, using various techniques, such as term frequency-inverse document frequency (TF-IDF), Latent Dirichlet Allocation (LDA), or other techniques used to identify the relevance of a word in textual content to other words in textual content.

Knowledge graph generator 144 uses the training data set of documents or textual content to build a graph representation of relationships between topics identified in the training set of documents. Generally, a knowledge graph may be generated by identifying nouns in the training data set of documents or textual content. A node in the knowledge graph may be generated for each noun, and connections between nodes may be generated based on the presence of pairs of nouns in the training data set of documents or textual content. Generally, the knowledge graph may add connections between nodes such that the knowledge graph is an unweighted graph representing the fact that different nodes are connected to each other and generally does not assign a relevance or importance between each pair of nodes. Because knowledge graphs are generally unweighted, connections may exist between nodes having a high degree of correlation (e.g., nodes representing topics or nouns that are commonly found together) or nodes having a low degree of correlation (e.g., nodes representing topics or nouns that are rarely found together).

In some embodiments, knowledge graph generator 144 may truncate the generated knowledge graph based on the entry degree for each node in the knowledge graph. The entry degree of a node generally is the number of other nodes in the knowledge graph that point to the node, where a higher entry degree represents nodes that are more connected to other nodes than nodes having a lower entry degree. To truncate the generated knowledge graph, knowledge graph generator 144 can identify nodes with an entry degree that is less than a threshold number. The threshold number can be defined a priori by a user of the model generator 140 or by a developer of the model generator 140, or may be defined as a property of a request to generate a complementary model. Generally, in truncating the generated knowledge graph, knowledge graph generator 144 can remove nodes having an entry degree that is less than the threshold number that are not connected to nodes having an entry degree that is greater than or equal to the threshold value, and then identify nodes that are no longer connected to any other node in the knowledge graph. The identified nodes that are no longer connected to any other node in the knowledge graph may also be deleted from the knowledge graph.

Complementary model builder 146 uses the relevancy model generated by relevancy model generator 142 and the knowledge graph generated by knowledge graph generator 144 to build a complementary model. As discussed, the complementary model may be a weighted knowledge graph, where weights are derived from the relevancy model. To build the complementary model, complementary model builder 146 may separate the content of each node in the knowledge graph into an entity and an attribute. A weight may be added to an edge connecting a node based on the relevancy score of the pairing of entities determined from the relevancy model. Generally, weights may be the same for each pair of entities, and weights may differ for relationships between one entity and other entities.

In some embodiments, complementary model builder 146 can augment the complementary model based on information included in text provided to application server 130 for analysis. To augment the complementary model, complementary model builder 146 can identify new nodes that are not currently included in the complementary model. These new nodes may, for example, include information about an entity and an associated attribute for which a node may be created in the complementary model. An initial weight for a connection between the new node and existing node may be set based on a relevancy score determined for the relationship between the entity in the new node and the entity in the existing node. In some embodiments, complementary model builder 146 can further adjust the weights between other nodes in the complementary model based on whether an entity and attribute pairing is present in the text provided to application server 130 for analysis. Where entity and attribute pairings are present in the text provided to application server 130 for analysis, the weights in the complementary model may be increased. Meanwhile, where entity and attribute pairings are absent in the text provided to application server 130 for analysis, the weights in the complementary model may be decreased.

In some embodiments, where the text provided to application server 130 includes entity information, but does not include attributes associated with the entities, the complementary model may be augmented by adding a node to the complementary model including the new entities that do not already exist in the complementary model. The node may have an empty, or null, attribute. To identify a node to connect the new node to, complementary model builder 146 can use a clustering algorithm to identify a central node based on entities included in the text provided to application server 130. An initial weight may be assigned to the new node, and the weights of existing nodes may be modified based on whether or not entities associated with the existing nodes are included in the text provided to application server 130 for analysis. For entities that are included in the text provided to application server 130 for analysis, the weights for a connection between the central node and the corresponding nodes in the complementary model may be increased. Entities that are not included in the text provided to application server 130 and are connected to the central node may have their weights decreased. The amount of an increase and decrease to weightings between nodes may be defined a priori either by a user of the model generator 140 or a developer of the model generator 140.

After complementary model builder 146 builds or updates a complementary model, complementary model builder 146 may deploy the complementary model to application server 130 for execution. As discussed, the complementary model may be deployed to text data analyzer 134, and text data analyzer 134 can use the complementary model to identify entities from a provided textual data set (e.g., a document, a phrase, etc.) that are relevant to the provided textual data set.

Training data store 150 is generally representative of a data repository in which a training data set of documents or other textual content used to train the relevancy model and the knowledge graph model used to generate a complementary model. Training data store 150 may include a plurality of separate repositories in which different types of documents may be stored. These repositories may be, for example, repositories for different domains of documents, such as technical requirement documents, medical diagnosis documents, and other classes of documents for which a complementary model may be generated. Training data store 150 may be structured as a relational or a non-relational database, a flat file store, a hierarchical file store, or any other storage system in which documents used to train relevancy and knowledge graph models may be store.

Figure 2:
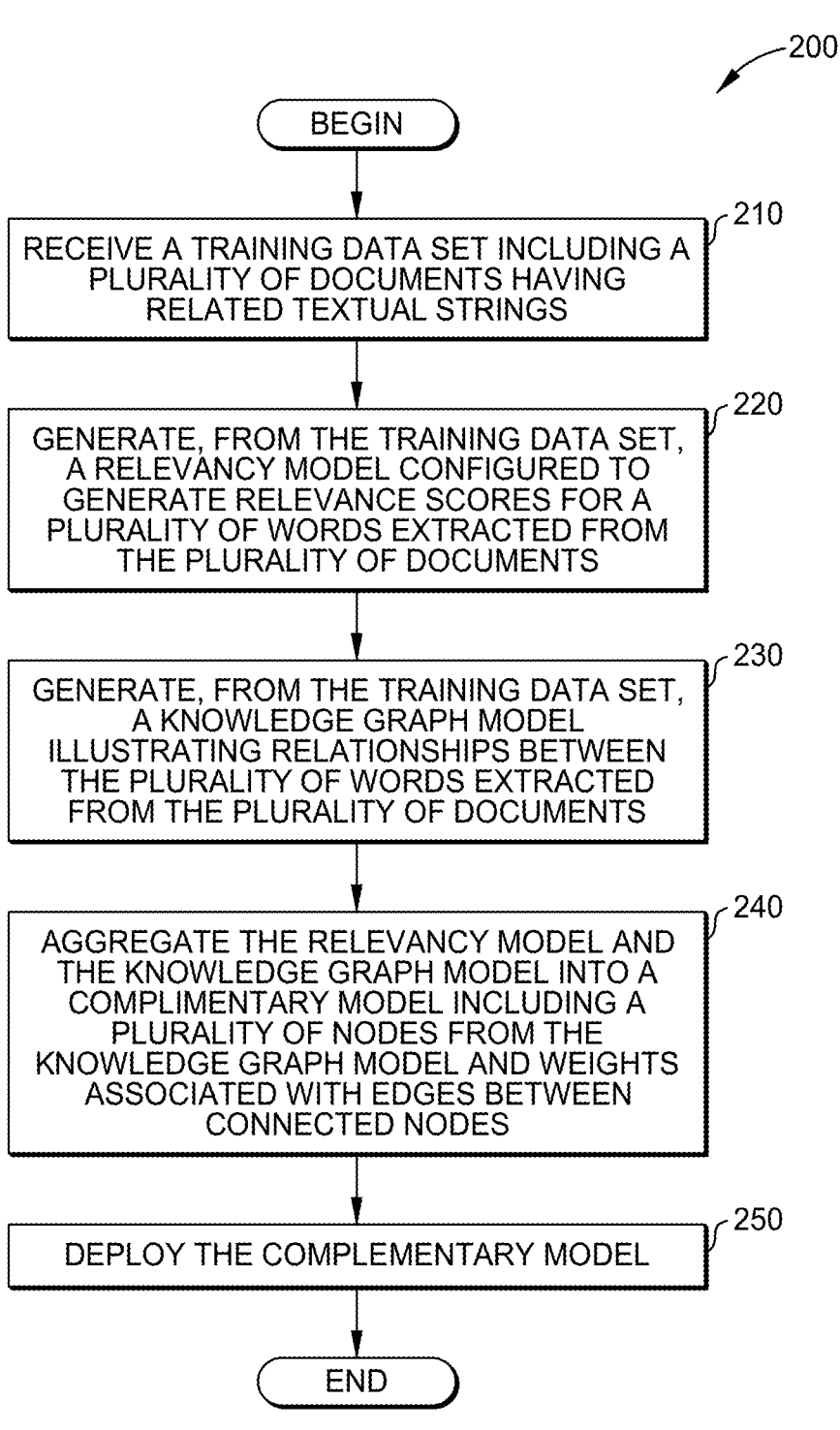
FIG. 2 illustrates example operations for generating a complementary model from a relevancy model and a knowledge graph model trained from a training data set of documents, according to one embodiment.

FIG. 2 illustrates example operations 200 that may be performed by a system to generate a complementary model based on a relevancy model and a knowledge graph model trained from a training data set of documents or other textual content, according to aspects of the present disclosure. As illustrated, operations 200 may begin at block 210, where a system receives a training data set including a plurality of documents. The plurality of documents generally include a plurality of related text strings. As discussed, the plurality of documents may be a set of documents belonging to a specific domain of knowledge for which a complementary model is to be generated, and the related text strings may be text strings related to that specific domain of knowledge. For example, where a complementary model is being generated to analyze technical requirements documents, the documents in the training data set may include a variety of technical requirements documents for similar technical projects; in another example, where a complementary model is being generated to analyze medical data, the documents in the training data set may include documents about previous diagnoses and the associated symptoms for those diagnoses, as well as medical treatises, encyclopedia entries, and the like.

At block 220, the system generates, from the training data set, a relevancy model configured to generate relevance scores for a plurality of words extracted from the plurality of documents. The relevancy model may be generated by identifying nouns in the documents in the training data set. For each pair of nouns identified in the documents, the system can calculate a relevance score based on the number of times the pair of nouns is identified in the documents, a distance between the pair of nouns, and other information that may influence the relevance of a pair of nouns in the document. For example, a larger number of occurrences of a pair of nouns may cause the relevancy model to generate a higher relevance score, while a smaller number of occurrences of the pair of nouns may cause the relevancy model to generate a lower relevance score. In another example, a smaller distance between the pair of nouns in a document may indicate a closer relationship between the nouns and cause the relevancy model to generate a higher relevance score, while a larger distance may indicate a more distance relationship between the nouns and cause the relevancy model to generate a lower relevance score.

At block 230, the system generates, from the training data set, a knowledge graph model illustrating relationships between the plurality of words extracted from the plurality of documents. As discussed, the knowledge graph model may be an unweighted graph that illustrates relationships as connections between nodes in the graph. Nodes with a larger number of connected nodes generally represent more connected nodes than those with a smaller number of connected nodes. In some embodiments, the system can truncate the generated knowledge graph model to remove nodes from the knowledge graph that have fewer than a threshold number of nodes connected to it.

At block 240, the system aggregates the relevancy model and the knowledge graph model into a complementary model. The complementary model may include a plurality of nodes from the knowledge graph and weights associated with edges between connected nodes in the knowledge graph. The weights associated with edges between connected nodes in the knowledge graph may be, for example, generated based on relevancy scores for entities referenced in the connected nodes in the relevancy model generated at block 220.

At block 250, the system deploys the complementary model. As discussed, the system can deploy the complementary model to an application server for use in analyzing textual content. In some embodiments, the system can also or alternatively deploy the complementary model to a client device for execution or may generate a programmatic definition of the complementary model that can be integrated into other application source code or referenced as an external library.

Figure 3:
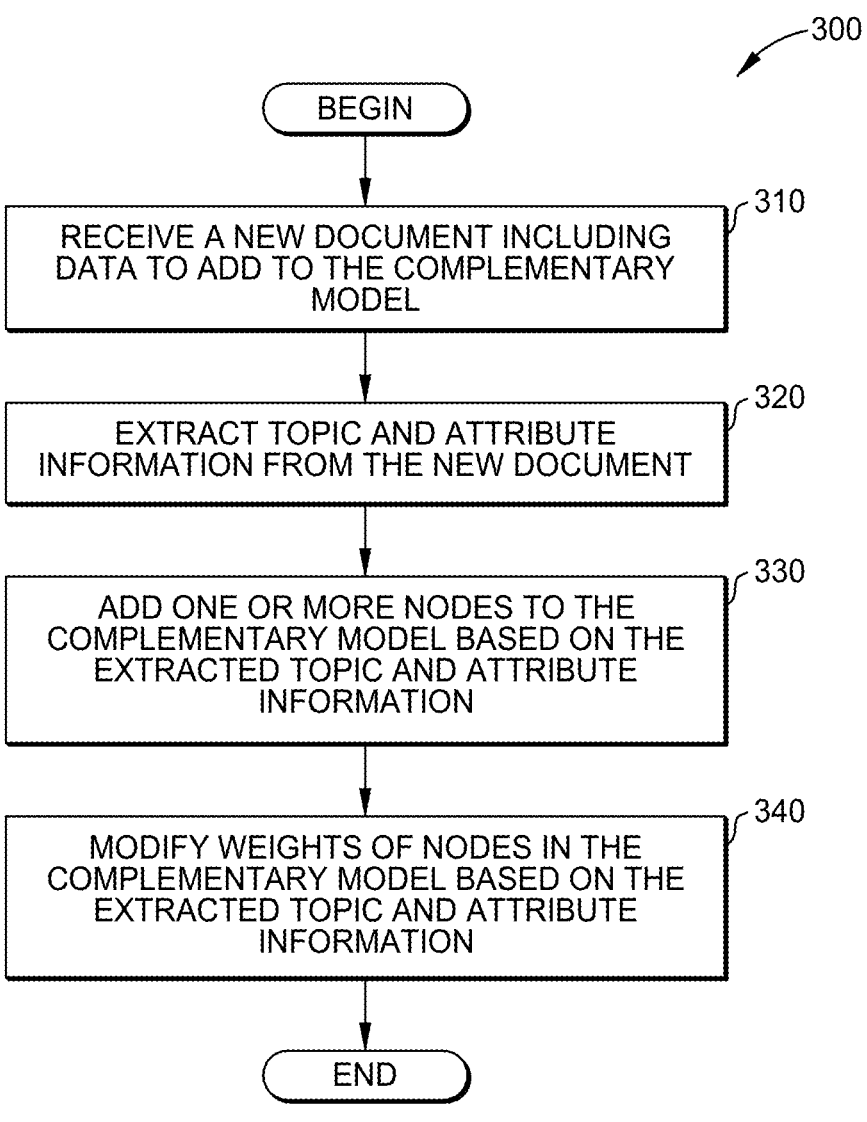
FIG. 3 illustrates example operations for updating the complementary model based on new documents added to a training data set of documents, according to one embodiment.

FIG. 3 illustrates example operations 300 that may be performed by a system to update a complimentary model, according to aspects of the present disclosure. As illustrated, operations 300 begin at block 310, where the system receives a new document including data to add to the complimentary model. The system may receive a new document as part of a training/updating process in which a model generator is explicitly instructed to update a complimentary model based on documents that have been added to a training data store since the previous update was performed to the complimentary model or as part of a text content analysis process in which the complimentary model is used to extract information from the document.

At block 320, the system extracts topic and attribute information from the new document. To extract topic and attribute information from the new document, the system can parse the document for nouns, related to topics in the document, and adjectives that describe each noun, related to attribute information in the document. The system can extract topic and attribute information from the new document using various techniques, such as dictionary searches, semantic embeddings, sentence structure identification, and the like. In some embodiments, if the system identifies nouns, but no associated adjectives, in the new document, the attribute information may be set to a null value to indicate that no adjectives were discovered in the new document.

At block 330, the system adds one or more nodes to the complementary model based on the extracted topic and attribute information. To add nodes to the complementary model, the system examines the complementary model to determine whether nodes associated with the extracted topics and attributes already exist in the complementary model. For topics and attributes that do not already exist in the complementary model, a node representing those topics and attributes may be added to the complementary model and connected to a central node, which may be a node identified as related to the topics included in the new document. The connection between the node and the central node may have a weight assigned to it based on the relevance score determined for the connection between the entities in the node and the central node.

At block 340, the system modifies weights of nodes in the complementary model based on the extracted topic and attribute information. As discussed, the weights of the nodes in the complementary model may be adjusted based on whether an entity represented by a node is present or not present in the complementary model. Generally, nodes representing entities that are included in the new document may have increased weights, while nodes represent entities that are not included in the new document may have decreased weights. The weights may be increased or decreased based on a predefined value or a value included in a request to augment the complementary model based on the content of a new document.

Figure 4:
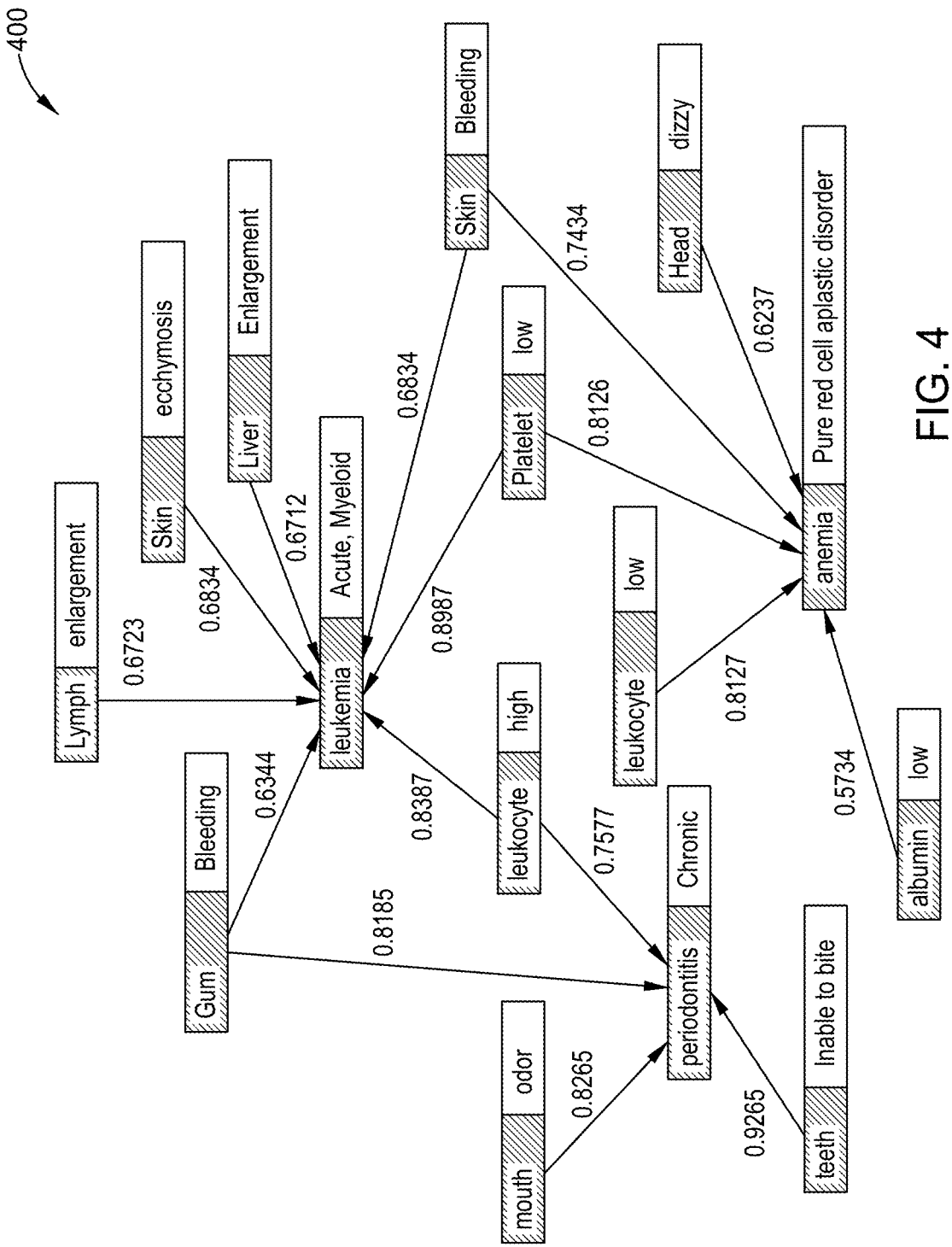
FIG. 4 illustrates an example complementary model generated from a relevancy model and a knowledge graph model trained from a training data set of documents, according to one embodiment.

FIG. 4 illustrates an example complementary model generated from a relevancy model and a knowledge graph model, according to aspects of the present disclosure. As illustrated, complementary model 400 may be structured as a graph in which nodes representing entity and attribute pairings are connected to other nodes. The nodes representing the entity and attribute pairings and the connections between these nodes may be derived from a knowledge graph generated from a training data set of documents or other textual content. Connections between a pair of nodes may indicate the existence of these nodes in a document. In some embodiments, as discussed, the nodes included in the complementary model may be a subset of the nodes in the knowledge graph generated by a knowledge graph generator. Nodes having an entry degree (i.e., a number of other nodes connected to the node) less than a threshold value may be excluded from the knowledge graph used to generate the complementary model, which may allow for the knowledge graph to include information that is likely to be the most relevant data.

Each connection between nodes in the complementary model may have a weight assigned thereto. The weight may be a relevance score generated by a relevancy model for the pairing of entities in the nodes. Generally, higher relevance scores may indicate a higher likelihood that the entities in two nodes are related, and lower relevance scores may indicate a lower likelihood that the entities in two nodes are related. As discussed, the weight information included in the complementary model may be adjusted as new textual content is received for analysis. Generally, where the new textual content includes entities in a pair of connected nodes, the weight for the pair of connected nodes may be increased, while the weight for the pair of connected nodes may be decreased where the new textual content does not include the entities in the pair of connected nodes.

Figure 5:
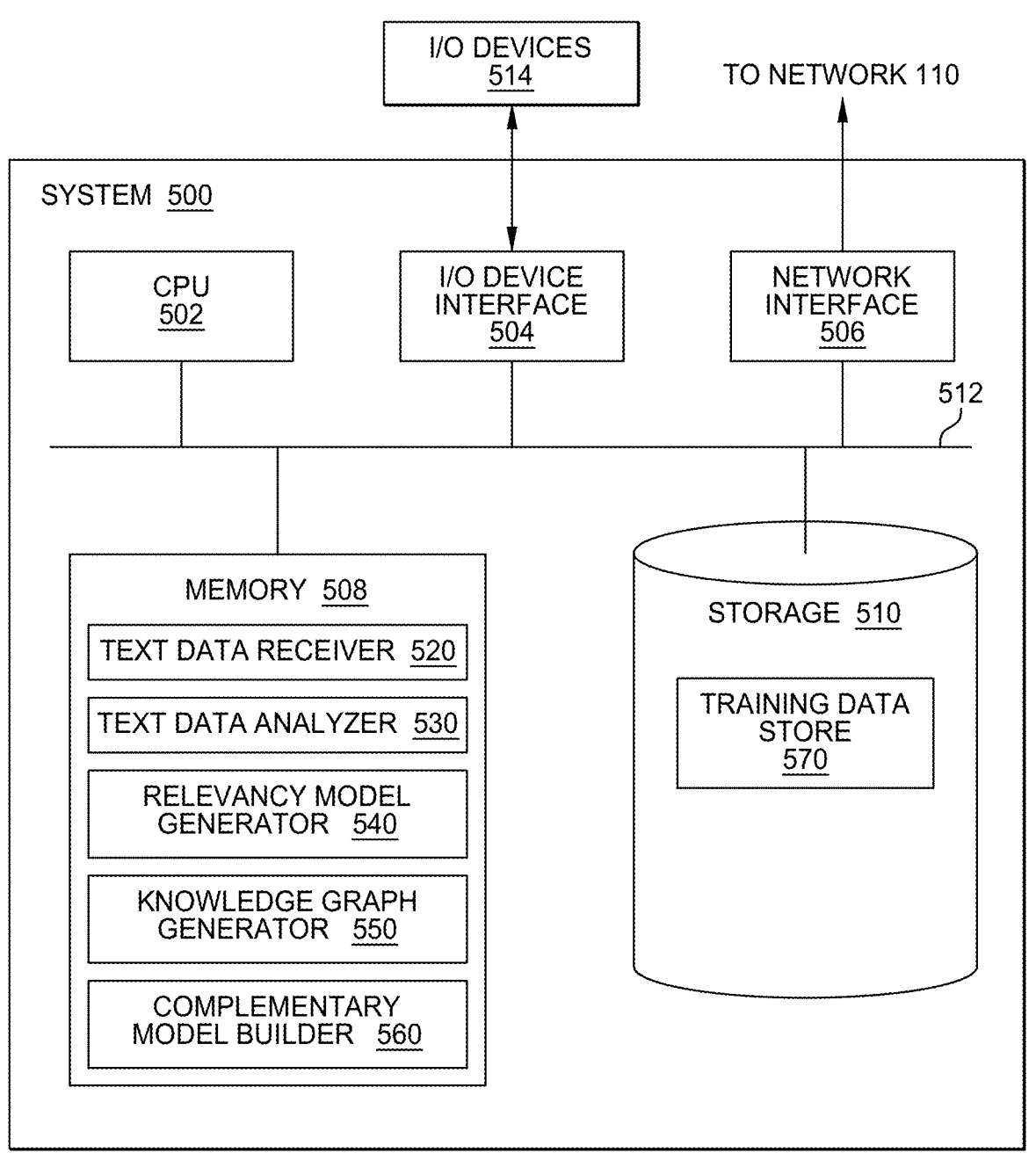
FIG. 5 illustrates an example system in which aspects of the present disclosure may be performed.

FIG. 5 illustrates an example system 500 that generates a complementary model for extracting content from textual data based on a relevancy model and a knowledge graph model, according to an embodiment. As illustrated, system 500 includes, without limitation, a central processing unit 502, one or more I/O device interfaces 504, which may allow for the connection of various I/O devices 514 (e.g., keyboards, displays, mouse devices, pen input, etc.) to the entity analytics system 500, network interface 506, a memory 508, storage 510, and an interconnect 512.

CPU 502 may retrieve and execute programming instructions stored in the memory 508. Similarly, the CPU 502 may retrieve and store application residing in the memory 508. The interconnect 512 transmits programming instructions and application data among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, storage 510 may be a disk drive, a solid state drive, a phase change memory device, or the like. Although shown as a single unit, the storage 510 may be a combination of fixed and/or removable storage devices, such as fixed disc drives, solid state drives, removable memory cards or optical storage, network attached storage (NAS), or a storage area network (SAN).

As illustrated, memory 508 includes a text data receiver 520, text data analyzer 530, relevancy model generator 540, knowledge graph generator 550, and complementary model builder 560. Text data receiver 520 generally is configured to receive textual content to be analyzed from a user of system 500. In some embodiments, text data receiver 520 may receive information identifying a location from which the textual content is to be retrieved. Text data receiver 520 may perform various postprocessing operations on the textual content to format the textual content for use by text data analyzer 530 in extracting topical information from the textual content. The postprocessing operations may include, for example, format conversion, character set conversion, or other operations that allow text data analyzer 530 to perform operations on a data set formatted according to a known or predefined pattern.

Text data analyzer 530 uses a complementary model generated by complementary model builder 560 to extract information from a received document or other textual content received for analysis. The extracted information may be transmitted to a requesting device for display on the requesting device.

Relevancy model generator 540 is generally configured to generate a relevancy model from a training data set of documents or related textual content. To generate a relevancy model, relevancy model generator 540 can identify nouns in the training data set of documents and count the occurrence of each noun in the training data set of documents. For each noun, a relevancy score can be generated with respect to each other noun in the training data set, where the relevancy score represents a likelihood that one noun is relevant and related to another noun in the training data set of documents. In some embodiments, the relevancy model may be truncated to include relevance scores calculated in respect of a predefined number of nouns. This predefined number may be defined a priori or in a request to generate the complementary model.

Knowledge graph generator 550 is generally configured to generate a knowledge graph model from the training data set of documents or related textual content. To generate a knowledge graph model, relevancy model generator 540 can identify nouns and associated adjectives in the training data set of documents or related textual content. A node may be created for each pairing of a noun and associated adjectives, and connections between nodes may be established based on the presence of entities in a pair of nodes in a document in the training data set. In some cases, knowledge graph generator 550 may truncate the knowledge graph by removing, from the knowledge graph, nodes having fewer than a threshold number of connections into the node.

Complementary model builder 560 uses the relevancy model generated by relevancy model generator 540 and the knowledge graph model generated by knowledge graph generator 550 to build a complementary model as a weighted knowledge graph. Weights in the complementary model may be derived from relevance scores in the relevancy model. In some embodiments, complementary model builder 560 may be configured to modify the complementary model based on information in new textual content to be analyzed. Generally, nodes representing entities not previously included in a training data set used to build the complementary model may be added to the complementary model, and existing weights may be adjusted based on the presence or absence of the associated entities in the new textual content to be analyzed.

Storage 510, as illustrated, includes a training data store 570. Training data store 570 generally stores a collection of documents or other textual content that may be used to train a relevancy model and a knowledge graph model, as discussed above. Training data store 570 may be a relational database, a non-relational database, a flat file store, or any other data repository in which encrypted data may be stored and retrieved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for generating a machine learning model for extracting information from textual content, comprising:

receiving a training data set including a plurality of documents having related textual strings;

training, from the training data set, a relevancy model configured to generate relevance scores for a plurality of words extracted from the plurality of documents, wherein the relevance scores comprise scores generated for pairs of words in the plurality of documents based on a number of times a pair of words appears in the plurality of documents and an average distance between the pair of words;

training, from the training data set, a knowledge graph model illustrating relationships between the plurality of words extracted from the plurality of documents, wherein training the knowledge graph model comprises truncating the knowledge graph model based on an entry degree of each node in the knowledge graph model, the truncating including removal of first nodes having an entry degree below a threshold value and connected to other nodes having an entry degree below the threshold value and removal of second nodes no longer connected to other nodes in the knowledge graph after removal of the first nodes;

aggregating the relevancy model and the knowledge graph model into a complementary model, wherein aggregating the relevancy model and the knowledge graph model into the complementary model comprises, for each respective edge in the knowledge graph, adding a weight value based on a relevance score from the relevancy model between nodes connected by the respective edge in the knowledge graph;

augmenting the complementary model to include additional nodes based on a text corpus received for analysis using the complementary model, each respective additional nodes being connected to an extant entity node in the knowledge graph and having an initial weight generated based on a relevancy score between the respective additional node and the extant entity node in the knowledge graph;

deploying the complementary model;

identifying, using the complementary model, a plurality of topics in an input document based on connections within a graph representing the input document and a threshold relevance score associated with the connections; and outputting, for display within a software application, the plurality of topics in conjunction with the input document.

2. The method of claim 1, wherein generating the relevancy model for the plurality of words extracted from the training set of documents comprises:

extracting nouns from sentences in the training set of documents;

generating an occurrence count for each noun extracted from the sentences in the training set of documents; and selecting a threshold number of the extracted nouns as topics to include in the relevancy model.

3. The method of claim 2, wherein the threshold number of the extracted nouns is set based on a number of occurrences of a noun in the training set of documents.

4. The method of claim 2, wherein the threshold number of the extracted nouns comprises a predetermined number of nouns to include in the relevancy model.

5. The method of claim 1, wherein generating the knowledge graph model comprises:

extracting, from each document in the training set of documents, nouns and related description words in the document;

generating nodes in a graph corresponding to each noun and description word identified in the training set of documents; and generating edges between connecting nodes representing nouns and nodes representing related description words in the document.

6. The method of claim 5, wherein generating the knowledge graph model further comprises:

sorting the nodes in the graph based on a number of nodes pointing to a specific node in the graph; and selecting a number of nodes in the graph as topics in the knowledge graph model.

7. The method of claim 1, wherein aggregating the relevancy model and the knowledge graph model into a complementary model comprises:

assigning an initial relevancy weight to an edge connecting a pair of nodes in the knowledge graph model based on a relevancy score between nouns referenced in the pair of nodes generated by the relevancy model.

8. The method of claim 1, wherein augmenting the complementary model comprises:

receiving an additional document;

extracting topic and attribute information from the additional document;

adding a node to the complementary model based on the extracted topic and attribute information from the additional document; and modifying the weights associated with edges between connected nodes in the knowledge graph model based on a presence or absence, in the additional document, of nouns associated with nodes in the knowledge graph.

9. The method of claim 1, wherein augmenting the complementary model comprises:

receiving an additional document;

extracting topic information from the additional document;

adding a node to the complementary model based on the extracted topic information from the additional document;

connecting the added node to a central node in the complementary model; and modifying the weights associated with edges between connected nodes in the knowledge graph model based on a presence or absence, in the additional document, of nouns associated with nodes in the knowledge graph.

10. A system, comprising:

a processor; and a memory having instructions stored thereon which, when executed by the processor, performs an operation for generating a machine learning model for extracting information from textual content, the operation comprising:

receiving a training data set including a plurality of documents having related textual strings;

training, from the training data set, a relevancy model configured to generate relevance scores for a plurality of words extracted from the plurality of documents, wherein the relevance scores comprise scores generated for pairs of words in the plurality of documents based on a number of times a pair of words appears in the plurality of documents and an average distance between the pair of words;

training, from the training data set, a knowledge graph model illustrating relationships between the plurality of words extracted from the plurality of documents, wherein training the knowledge graph model comprises truncating the knowledge graph model based on an entry degree of each node in the knowledge graph model, the truncating including removal of first nodes having an entry degree below a threshold value and connected to other nodes having an entry degree below the threshold value and removal of second nodes no longer connected to other nodes in the knowledge graph after removal of the first nodes;

aggregating the relevancy model and the knowledge graph model into a complementary model, wherein aggregating the relevancy model and the knowledge graph model into the complementary model comprises, for each respective edge in the knowledge graph, adding a weight value based on a relevance score from the relevancy model between nodes connected by the respective edge in the knowledge graph;

augmenting the complementary model to include additional nodes based on a text corpus received for analysis using the complementary model, each respective additional nodes being connected to an extant entity node in the knowledge graph and having an initial weight generated based on a relevancy score between the respective additional node and the extant entity node in the knowledge graph;

deploying the complementary model;

identifying, using the complementary model, a plurality of topics in an input document based on connections within a graph representing the input document and a threshold relevance score associated with the connections; and outputting, for display within a software application, the plurality of topics in conjunction with the input document.

11. The system of claim 10, wherein generating the relevancy model for words extracted from the training set of documents comprises:

extracting nouns from sentences in the training set of documents;

generating an occurrence count for each noun extracted from the sentences in the training set of documents; and selecting a threshold number of the extracted nouns as topics to include in the relevancy model.

12. The system of claim 11, wherein the threshold number of the extracted nouns is set based on a number of occurrences of a noun in the training set of documents.

13. The system of claim 11, wherein the threshold number of the extracted nouns comprises a predetermined number of nouns to include in the relevancy model.

14. The system of claim 10, wherein generating the knowledge graph model comprises:

extracting, from each document in the training set of documents, nouns and related description words in the document;

generating nodes in a graph corresponding to each noun and description word identified in the training set of documents; and generating edges between connecting nodes representing nouns and nodes representing related description words in the document.

15. The system of claim 14, wherein generating the knowledge graph model further comprises:

sorting the nodes in the graph based on a number of nodes pointing to a specific node in the graph; and selecting a number of nodes in the graph as topics in the knowledge graph model.

16. The system of claim 10, wherein aggregating the relevancy model and the knowledge graph model into a complementary model comprises:

assigning an initial relevancy weight to an edge connecting a pair of nodes in the knowledge graph model based on a relevancy score between nouns referenced in the pair of nodes generated by the relevancy model.

17. The system of claim 10, wherein augmenting the complementary model comprises:

receiving an additional document;

extracting topic and attribute information from the additional document;

adding a node to the complementary model based on the extracted topic and attribute information from the additional document; and modifying the weights associated with edges between connected nodes in the knowledge graph model based on a presence or absence, in the additional document, of nouns associated with nodes in the knowledge graph.

18. The system of claim 10, wherein augmenting the complementary model comprises:

receiving an additional document;

extracting topic information from the additional document;

adding a node to the complementary model based on the extracted topic information from the additional document;

connecting the added node to a central node in the complementary model; and modifying the weights associated with edges between connected nodes in the knowledge graph model based on a presence or absence, in the additional document, of nouns associated with nodes in the knowledge graph.

19. A non-transitory computer-readable medium having instructions stored thereon which, when executed by a processor, performs an operation for generating a machine learning model for extracting information from textual content, the operation comprising:

receiving a training data set including a plurality of documents having related textual strings;

training, from the training data set, a relevancy model configured to generate relevance scores for a plurality of words extracted from the plurality of documents, wherein the relevance scores comprise scores generated for pairs of words in the plurality of documents based on a number of times a pair of words appears in the plurality of documents and an average distance between the pair of words;

training, from the training data set, a knowledge graph model illustrating relationships between the plurality of words extracted from the plurality of documents, wherein training the knowledge graph model comprises truncating the knowledge graph model based on an entry degree of each node in the knowledge graph model, the truncating including removal of first nodes having an entry degree below a threshold value and connected to other nodes having an entry degree below the threshold value and removal of second nodes no longer connected to other nodes in the knowledge graph after removal of the first nodes;

aggregating the relevancy model and the knowledge graph model into a complementary model, wherein aggregating the relevancy model and the knowledge graph model into the complementary model comprises, for each respective edge in the knowledge graph, adding a weight value based on a relevance score from the relevancy model between nodes connected by the respective edge in the knowledge graph;

augmenting the complementary model to include additional nodes based on a text corpus received for analysis using the complementary model, each respective additional nodes being connected to an extant entity node in the knowledge graph and having an initial weight generated based on a relevancy score between the respective additional node and the extant entity node in the knowledge graph;

deploying the complementary model;

identifying, using the complementary model, a plurality of topics in an input document based on connections within a graph representing the input document and a threshold relevance score associated with the connections; and outputting, for display within a software application, the plurality of topics in conjunction with the input document.

20. The non-transitory computer-readable medium of claim 19, wherein augmenting the complementary model comprises:

receiving an additional document;

extracting topic and attribute information from the additional document;

adding a node to the complementary model based on the extracted topic and attribute information from the additional document; and modifying the weights associated with edges between connected nodes in the knowledge graph model based on a presence or absence, in the additional document, of nouns associated with nodes in the knowledge graph.

* * * * *